(12) United States Patent
Roseen

(10) Patent No.: US 12,152,718 B2
(45) Date of Patent: Nov. 26, 2024

(54) INSULATED PIPE

(71) Applicant: UPONOR INNOVATION AB, Virsbo (SE)

(72) Inventor: Patrik Roseen, Västerås (SE)

( * ) Notice: Subject to any disclaimer, the term of this patent is extended or adjusted under 35 U.S.C. 154(b) by 0 days.

(21) Appl. No.: 16/069,788

(22) PCT Filed: Feb. 23, 2017

(86) PCT No.: PCT/EP2017/054228
§ 371 (c)(1),
(2) Date: Jul. 12, 2018

(87) PCT Pub. No.: WO2017/144609
PCT Pub. Date: Aug. 31, 2017

(65) Prior Publication Data
US 2019/0017646 A1    Jan. 17, 2019

(30) Foreign Application Priority Data
Feb. 26, 2016 (DE) .................. 10 2016 103 446.0

(51) Int. Cl.
| | |
|---|---|
| *F16L 59/065* | (2006.01) |
| *F16L 11/22* | (2006.01) |
| *F16L 59/02* | (2006.01) |
| *F16L 59/153* | (2006.01) |
| *B32B 3/00* | (2006.01) |
| *F16L 11/04* | (2006.01) |
| *F16L 59/08* | (2006.01) |

(52) U.S. Cl.
CPC ............ *F16L 59/065* (2013.01); *F16L 11/22* (2013.01); *F16L 59/026* (2013.01); *F16L 59/029* (2013.01); *F16L 59/153* (2013.01); *B32B 3/00* (2013.01); *F16L 2011/047* (2013.01); *F16L 59/08* (2013.01)

(58) Field of Classification Search
CPC .... Y10T 428/231; F16L 59/065; F16L 59/153
See application file for complete search history.

(56) References Cited

U.S. PATENT DOCUMENTS 7,802,445 B2 *   9/2010   Winters ............... B67D 1/0867
                                                  138/111
7,854,241 B2 * 12/2010   Chenin ................. F16L 59/065
                                                  138/108

(Continued)

FOREIGN PATENT DOCUMENTS

| DE | 19817689 A1 | 10/1999 |
|---|---|---|
| DE | 102005045726 A1 | 4/2007 |

(Continued)

OTHER PUBLICATIONS

International Search Report for PCT/EP2017/054228 mailed May 4, 2017 submitted herewith (4 Pages).

(Continued)

*Primary Examiner* — Alexander S Thomas
(74) *Attorney, Agent, or Firm* — Haynes Beffel & Wolfeld LLP; Andrew L. Dunlap

(57) ABSTRACT

The present invention relates to an insulated pipe comprising one or more inner pipes comprising a plastic, a flexible vacuum insulation panel surrounding the one or more inner pipes, and an outer jacket.

21 Claims, 3 Drawing Sheets

(56) References Cited

U.S. PATENT DOCUMENTS

Figure 1:
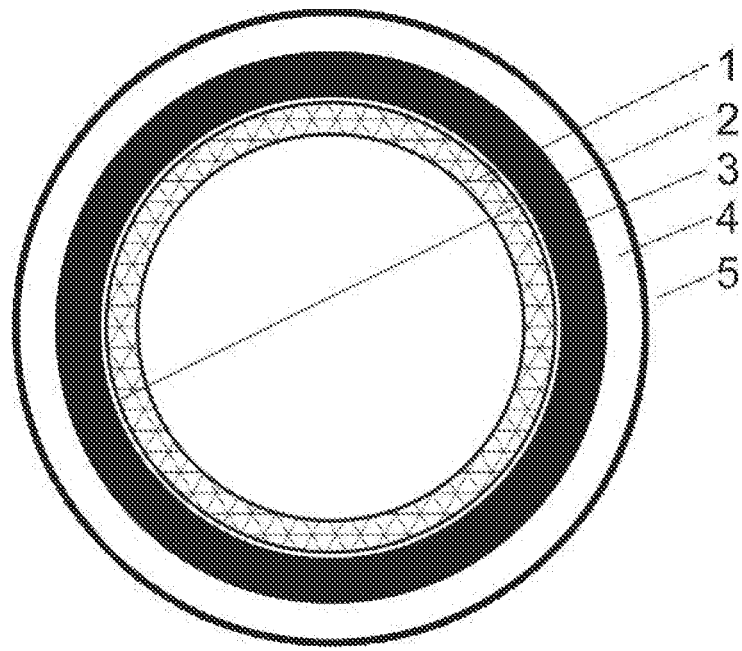

| | | | |
|---|---|---|---|
| 10,006,581 B2 | 6/2018 | Kuhn et al. | |
| 2003/0101683 A1* | 6/2003 | Gregorio | F16L 59/065 |
| | | | 52/794.1 |
| 2003/0124300 A1* | 7/2003 | Gregorio | B29C 44/5627 |
| | | | 428/69 |
| 2004/0045619 A1* | 3/2004 | Backman | F16L 9/121 |
| | | | 138/137 |
| 2009/0007594 A1 | 1/2009 | Dylla | |
| 2011/0120620 A1 | 5/2011 | Hiemeyer et al. | |
| 2011/0129398 A1 | 6/2011 | Markowz et al. | |
| 2013/0149481 A1 | 6/2013 | Hiemeyer et al. | |
| 2015/0375433 A1 | 12/2015 | Brønnum et al. | |
| 2016/0003403 A1 | 1/2016 | Smith | |

FOREIGN PATENT DOCUMENTS

| | | |
|---|---|---|
| DE | 202008002369 U1 | 4/2008 |
| EP | 0949444 A2 | 10/1999 |
| GB | 2397076 A | 7/2004 |
| WO | 95/00797 A1 | 1/1995 |
| WO | 2014/183814 A1 | 11/2014 |

OTHER PUBLICATIONS

EP 17706809.5—Response to Rule 161/162 and PCT Written Opinion filed Mar. 20, 2019, 19 pages.

EP 17706809.5—Office Action dated Mar. 20, 2020, 6 pages.

EP 17706809.5—Response to Office Action dated Mar. 20, 2020 filed Jul. 20, 2020, 57 pages.

PCT/EP2017/054228—International Preliminary Report on Patentability mailed Sep. 7, 2018, 8 Pages.

PCT/EP2017/054228—Written Opinion mailed May 4, 2017, 6 Pages.

CA Examination Report from CA Application No. 3,010,971 dated Jul. 19, 2023, 8 pages.

* cited by examiner

INSULATED PIPE

CROSS-REFERENCE TO RELATED APPLICATIONS

This application is a U.S. national phase application filed under 35 U.S.C. § 371 of International Application No. PCT/EP2017/054228, filed Feb. 23, 2017, designating the United States, which claims priority from German Patent Application 10 2016 103 446.0, filed Feb. 26, 2016, which are hereby incorporated herein by reference in their entirety for all purposes.

FIELD

The present application relates to an insulated pipe, in particular to a vacuum insulated pipe for local heat distribution.

BACKGROUND

Modern solutions for local heat distribution need to meet the strictest requirements with regard to safety, reliability, robustness, and efficiency.

It is known to use pre-insulated pipes for distribution of warm drinking water or for heating supply networks in different building types, among them hotel complexes, industrial facilities and single family houses as well as multi storage buildings. Such pipes may be used to supply heat from the local boiler room directly into the building or an easy way to connect the pre-insulated pipe to the manifold of the underfloor heating system.

SUMMARY

Until now vacuum-insulated pipes were used for primary heat distribution comprising a metallic inner pipe, thus being inflexible. Such pipes are, for example, known from WO 95/00797 A1.

The object of the present invention is to provide an insulated pipe having a very low thermal conductivity while being compact and flexible enough such that it can be coiled up. A further object of the present invention is to provide an insulated pipe having excellent ageing properties even if coiled up.

This object has been achieved by providing an insulated pipe comprising:
  one or more inner pipes comprising a plastic
  a flexible vacuum insulation panel (VIP) surrounding the one or more inner pipes
  an outer jacket, preferably comprising a plastic.

In a preferred embodiment, the one or more inner pipes are reinforced and thus comprise a reinforcement material and a plastic. The reinforcement material can be inorganic or organic. For example, it is possible to use organic fibers as reinforcement material.

In a preferred embodiment, the one or more inner pipes are multi-layer pipes, preferably comprising one or more diffusion barrier layers, such as an aluminum layer. Preferably, the diffusion barrier is made of a material comprising, preferably consisting of, selected from the group consisting of ethylene vinyl alcohol (EVOH), aluminium foil, and a combination thereof.

In a preferred embodiment, the one or more inner pipes consist of a plastic.

Preferably, the plastic is a polyolefine. The polyolefine used for the inner pipe is not limited. It is possible to use non-crosslinked polyolefines. Preferably, the non-cross linked polyolefines are selected from the group consisting of polyethylene, preferably PE-RT (Polyethylene of Raised Temperature resistance), polypropylene, preferable PPR (about 5% PE in the molecular chain of PP random uniform polymer (random copolymer), polybutylene terephthalate (PBT), and mixtures thereof. Alternatively, a cross-linked polyolefine can be used. An example for a cross-linked polyolefine is cross-linked polyethylene (PEX) which is preferably made from high density polyethylene (HDPE). PEX contains cross-linked bonds in the polymer structure, changing the thermoplastic to a thermoset. Cross-linking is accomplished during or after the extrusion of the tubing. The degree of cross-linking is preferably between 60 and 90%. A higher degree of cross-linking could result in brittleness and stress cracking of the material while a lower degree of cross-linking could result in an inner pipe with poorer physical properties. More preferably, the crosslinking degree is set in accordance with ASTM Standard F876 or ISO 15875. Cross-linked polyethylene (PEX) is the preferred material for the one or more inner pipes due to its material properties, in particular flexibility and high-temperature resistance.

Vacuum insulation panels (VIPs) are sheets in which insulating materials or inert fillers are completely encapsulated and the envelope, which has maximum impermeability to gases, is very substantially evacuated. Very low gas diffusion values are needed for the envelope material so that once the vacuum has been applied it is retained for the maximum time. In accordance with the present invention, a flexible VIP is a VIP having a higher flexibility than a VIP having a core comprising prepressed silica. In particular, according to the present invention, a flexible VIP is a VIP, wherein the core of the vacuum insulation panel comprises a powdery material, such as powder of inorganic oxides. Processes for producing such VIPs having a core comprising powdery material are known, for example, from WO 2014/183814 A1. The VIP preferably has a thickness from 5 to 40 mm, more preferably 5 to 35 mm, most preferred 8 to 30 mm. The U-value of the VIP is preferably below 0.3 W/(m$^2$K), more preferably below 0.25 W/(m$^2$K).

In the context of the present specification, the sheets of the VIP in which insulating materials or inert fillers are completely encapsulated is referred to as envelope. Further, the contents of the envelope is referred to as the core of the VIP. The core preferably comprises an unmolded, loose, powdery material.

The VIP preferably comprises a filter material. The filter material can, for example, consist of a nonwoven polyester fabric, which can be adhesive-bonded to the envelope of the VIP. The filter facilitates evacuating the envelope of the VIP filled with the unmolded, loose powdery material.

For example, the filter can be used, as described in DE 102005045726: An unmolded, loose powder is filled, particularly poured, into the opening of a bag which is formed from a high-barrier film and is open on one side; a filter material that is permeable to air and impermeable to powder dust is fixed to the internal face of the film bag in the area of the opening of the filled film bag in such a way that the interior of the bag is closed in a dust-tight manner while air can still be discharged; the interior of the dust-tightly closed film bag is then evacuated; and the evacuated film bag is finally air-tightly closed in a vacuum.

In a variation of this method, the VIP is produced as follows: A bag is welded along three edges. A filter is welded such that it covers the fourth edge. The remaining edge is not welded, the bag can still be opened. However, the opening is completely covered by the filter. A "needle nozzle" is inserted through the filter, and the bag is filled with unmolded, loose silica powder through the "needle nozzle". Thus, there is minimal impact on the filter. Thereafter the bag is exposed to vacuum and thereafter the fourth edge is permanently welded.

Alternatively, a method as described in US20130149481 A1 can be used: providing an unmolded, loose powder core disposed on a first barrier film such that the barrier film presents a fully circumferential protrusion with respect to a first, adjacent main surface of the core; providing a flat filter material laid thereover such that the filter material presents a fully circumferential protrusion with respect to a second main surface, adjacent the filter material, of the core; the flat filter material being connected in the region of its protrusion to the protrusion of the first barrier film, such that the core volume or powder volume is sealed; evacuating the core in a vacuum chamber to a pressure of <10 mbar, applying a second barrier film externally to the filter material such that the second barrier film presents a fully circumferential protrusion which protrudes beyond the second main surface of the core and is connected under vacuum to the protrusion of the filter material and/or to the protrusion of the first barrier film, such that the inner volume, consisting of the powder core and the filter sheet material, is sealed vacuum-tightly; and removing the sheet material from the vacuum chamber after aeration. The latter method is preferred as it allows more rapid evacuation.

In a preferred embodiment, at least one of the sides of the envelope of the VIP has grooves for enhancing the flexibility. These groves can, for example, be formed by embossing the prefilled envelope on a mold in a vacuum oven. These groves preferably do not penetrate the insulation in order to prevent a thermal bridge effect. The number and arrangement of the grooves is not limited. Preferably, the grooves are arranged regularly. More preferably, the grooves are arranged such that they form grooves in the direction of the greatest length of the VIP. In particular, the space between the grooves is between 0.5 and 5 cm, more preferably between 1 and 4 cm, in particular between 1 and 3 cm.

In a preferred embodiment, the insulated pipe further comprises a diffusion barrier between the one or more inner pipes and the flexible vacuum insulation panel. The diffusion barrier is preferably resistant to humidity. For example, an aluminum foil can be used for the diffusion barrier. Alternatively or in addition, a layer of ethylene vinyl alcohol (EVOH), which is a formal copolymer of ethylene and vinyl alcohol, can be used as the diffusion barrier. The EVOH-layer prevents oxygen from entering the fluids inside the pipe and thus potentially causing corrosion on radiators. It is possible to extrude the diffusion barrier on the inner pipe. Alternatively or in addition, it is possible to wrap the VIP in a diffusion barrier, for example an aluminum foil. The wrapping of the VIP in the diffusion barrier improves the aging properties of the VIP. Preferably, the diffusion barrier is made of a material comprising, preferably consisting of, selected from the group consisting of ethylene vinyl alcohol (EVOH), aluminium foil, and a combination thereof.

As the material for the outer jacket, the same plastic as specified above for the one or more inner pipes can be used.

In a preferred embodiment, the insulated pipe further comprises a flexible layer beneath the outer jacket, preferably made of, preferably cross-linked, polyethylene foam or polyurethane. In view of a diminished brittleness, cross-linked or non-cross-linked polyethylene foam is preferred. This flexible layer ensures that the temperature of the VIP will not be too high during the processing of the outer jacket and also provides for mechanical protection of the VIP. More specifically, the flexible layer provides for thermal insulation/mechanical protection of the VIP panel during processing (i.e. the high temperatures that the VIP will be exposed to when the outer plastic layer is extruded on the outside of the pipe). This enables continuous production of pipe. In contrast thereto, prior art methods relying on a metal pipe make use of batch methods wherein polyurethane is molded in place. Therefore, there is no risk of exposure of the VIP to high temperatures during production (that can degrade the insulation) for those products. Cross-linked polyethylene (PEX) foam is particularly preferred due to its heat stability which facilitates the production of the pipe. Another function is mechanical protection of the VIP and and thermal insulation. Moreover, the PEX-foam has a lower humidity uptake than the PE-foam.

In a preferred embodiment, the insulated pipe further comprises one or more spacer between the vacuum insulation panel and the outer jacket, preferably made of a foamed polymer.

In a preferred embodiment, the core of the vacuum insulation panel comprises inorganic oxides in the form of a powder, preferably silica powder, more preferably fumed silica powder. Such a powder of inorganic oxides is preferred because it improves the flexibility of the VIP, particularly in comparison to prepressed silica. Silica is preferred as it is more resistant to ageing (i.e. a pressure increase due to the in-diffusion of gasses increases the lamba at a slower rate for the silica powder due to its nano-structure). In addition, silica has a small pore size and thus is not as pressure sensitive as, for example, glass fiber. Therefore, silica is suitable for long term applications, especially at elevated temperatures, when the diffusion is more rapid. Fumed silica, also known as pyrogenic silica because it is produced in a flame, consists of microscopic droplets of amorphous silica fused into branched, chainlike, three-dimensional secondary particles which then agglomerate into tertiary particles. The resulting powder has an extremely low bulk density and high surface area. Fumed silica is made from flame pyrolysis of silicon tetrachloride or from quartz sand vaporized in a 3000° C. electric arc. Major global producers are Evonik (Aerosil®), Cabot Corporation (Cab-O-Sil®), Wacker Chemie (HDK®), Dow Corning, and OCI (Konasil®). Fumed silica is particularly preferred because VIPs comprising fumed silica degrade about 100 times slower than glass fiber panels, and are therefore preferable for elevated temperature applications. For example, the core of the VIP can comprise fumed silica, IR opacifiers, and a small amount of organic fibers. The core material is preferably non-combustible. It is preferably sealed in a high gas barrier film and an extra glass fibre textile for mechanical shock protection.

In a preferred embodiment, the vacuum insulation panel further comprises an outer shell made of an element selected from the group consisting of metallized foil, polyester or polyamide, and a combination thereof, preferably metallized foil. It is noted that aluminium foil contains—for the same area, 21 times more aluminum compared to metallized film. In addition, aluminum possesses a high heat conductivity. Thus, one would expect more heat bridges in the VIP comprising aluminum foil compared to the VIP comprising metallized foil, resulting in a lower lambda value of the VIP. Therefore, the metallized foil is preferred in view of the heat conductivity.

In a preferred embodiment, the vacuum insulation panel comprises ethylene-vinylalcohol-copolymer layers inside the vacuum insulation panel. Such ethylene-vinylalcohol-copolymer layers are preferred in view of the aging charactersitics.

In a preferred embodiment, the vacuum insulation panel comprises a shiplap for gapless joints.

In a preferred embodiment, the insulated pipe comprises one inner pipe arranged in a concentric manner with respect to optional diffusion barrier, the vacuum insulation panel, and the outer jacket. In this embodiment, the vacuum insulation panel can be wrapped more than once, preferably twice, around the inner pipe. Such an arrangement is preferred for insulated pipes comprising an inner pipe with a diameter of less than 100 mm, more preferably less than 75 mm, in particular less than 50 mm.

In a preferred embodiment, the insulated pipe comprises two inner pipes arranged in a non-concentric manner with respect to the outer jacket. In this embodiment, each inner pipe can be surrounded by an optional diffusion barrier and a vacuum insulation panel. Alternatively, only one of inner pipe can be surrounded by an optional diffusion barrier and a vacuum insulation panel. Alternatively, both inner pipes can be wrapped by one vacuum insulation panel. Preferably, the wrapping of the two inner pipes with the sole vacuum insulation panel is such that the inner pipe for transporting the fluid with the higher temperatures is better insulated. More preferably, the inner pipe for transporting fluids with higher temperature is completely wrapped in the VIP, while only the part of the circumference of the second inner pipe for transporting fluids with lower temperature not facing the first inner pipe is wrapped in the VIP.

In a preferred embodiment, the bending force for 90° bending a pipe piece having an inner pipe with a diameter of 20 to 60 mm, preferably 25 to 50 mm, in particular 25 to 40 mm, clamped at a distance of 1 m around a support differs less than 120 N, preferably less than 40%, more preferably less than 30% compared to the same pipe without vacuum insulation panel.

In a preferred embodiment, the bending force for 90° bending a pipe piece having an inner pipe with a diameter of 60 to 120 mm, preferably 65 to 100 mm, in particular 65 to 90 mm, clamped at a distance of 1 m around a support differs less than 20%, preferably less than 10% compared to the same pipe without vacuum insulation panel.

In a preferred embodiment, the insulated pipe has a thermal conductivity λ of less than 0.02 W/(m*K), preferably less than 0.015 W/(m*K).

In a preferred embodiment, the insulated pipe has an U-value of less than 0.35 W/(m$^2$*K), preferably less than 0.3 W/(m$^2$*K), more preferably leass 0.25 W/(m$^2$*K), in particular less than 0.2 W/(m$^2$*K).

In a preferred embodiment, the insulated pipe has a linear thermal conductance A of less than 0.08 W/(m*K), preferably less than 0.07 W/(m*K).

In a preferred embodiment, the insulated pipe has a linear thermal conductance A which is 60%, preferably 65%, reduced compared to the same pipe without vacuum insulation panel.

The pipes according to the present invention can be suitably used for distribution of warm drinking water or local heat distribution, in particular for local heat distribution to the final destinations (secondary networks). The pipes have very good thermal insulation properties fulfilling all the current legal requirements in Europe. The size of the pipe is more compact compared with pipes of the prior art having the same thermal insulation properties (low heat conductivity). Moreover, the flexibility of the pipes is sufficient, for example, to allow to coil them up, for example, in lengths of 200 m. Finally, the pipes according to the present invention have excellent ageing properties even if coiled up. This is particularly surprising because significantly bending the pipe means that the VIP is bent in two directions, the first direction being the wrapping around the pipe and the secong direction being the bending following the bending of the pipe.

In the following, the Figures are briefly described:

BRIEF DESCRIPTIONS OF THE DRAWING

FIG. 1 shows a vacuum insulated pipe comprising one inner PEX-pipe

Figure 2:
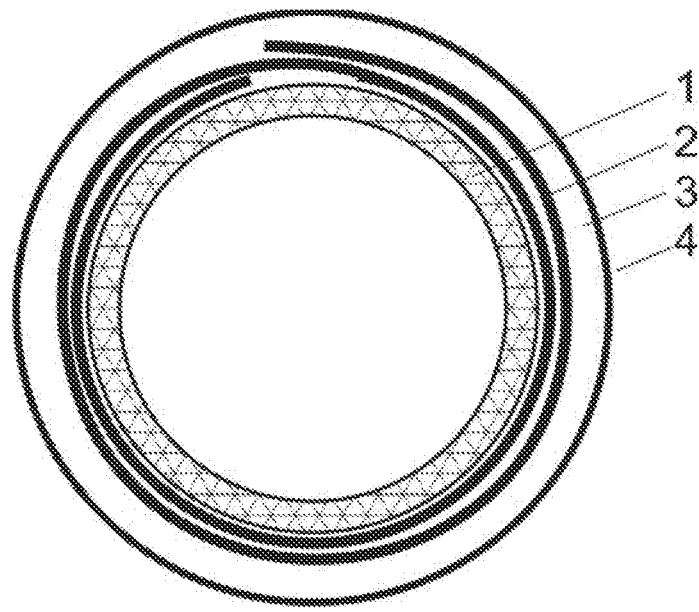
Figure 3:
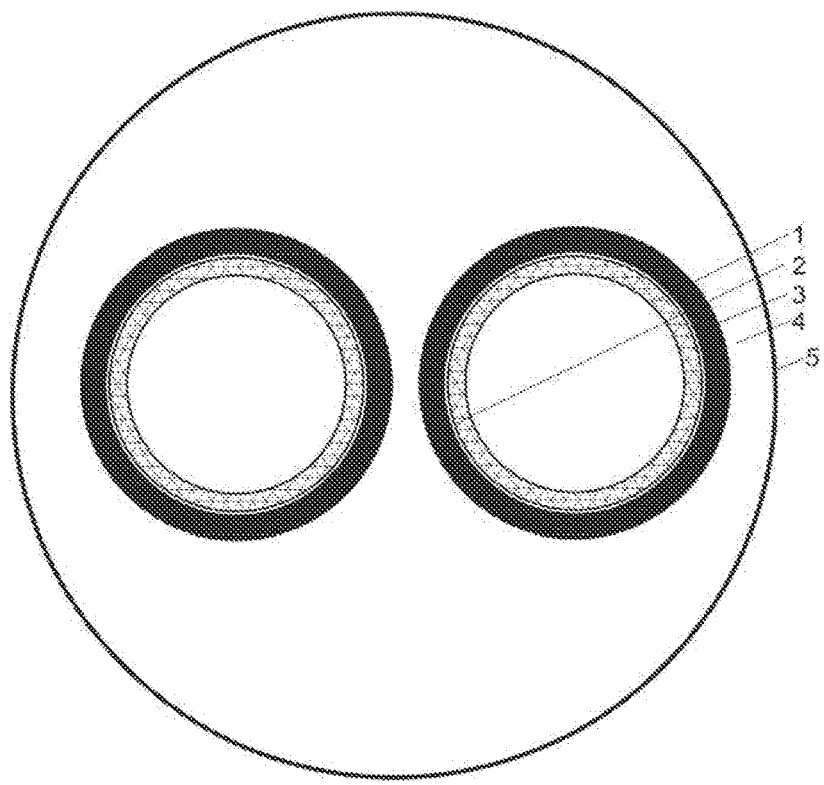
Figure 4:
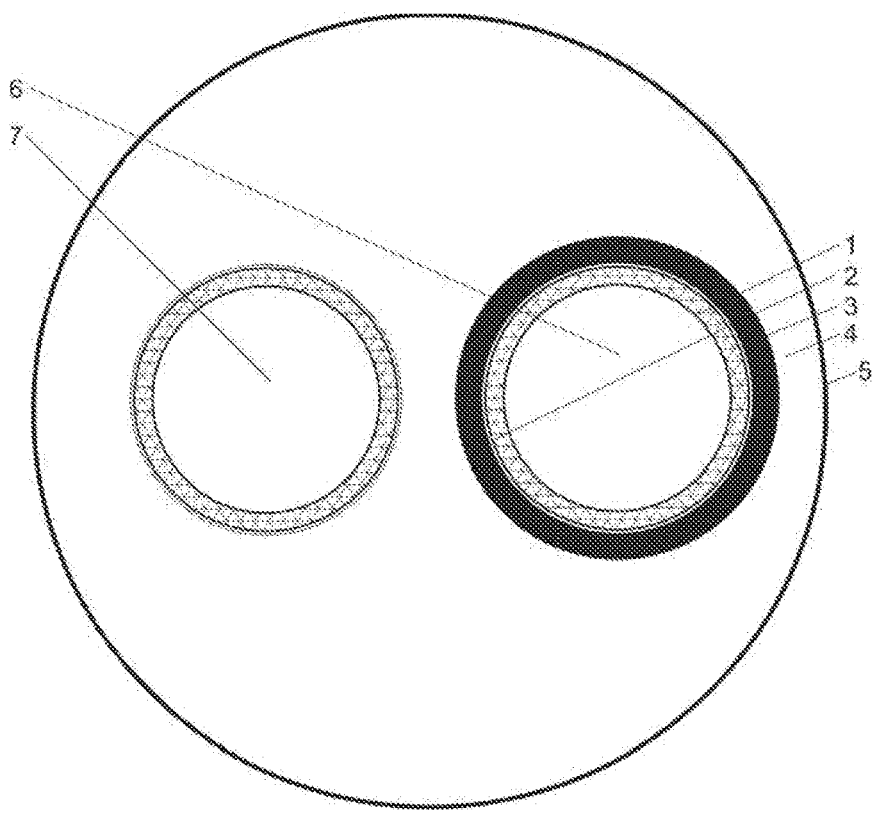
Figure 5:
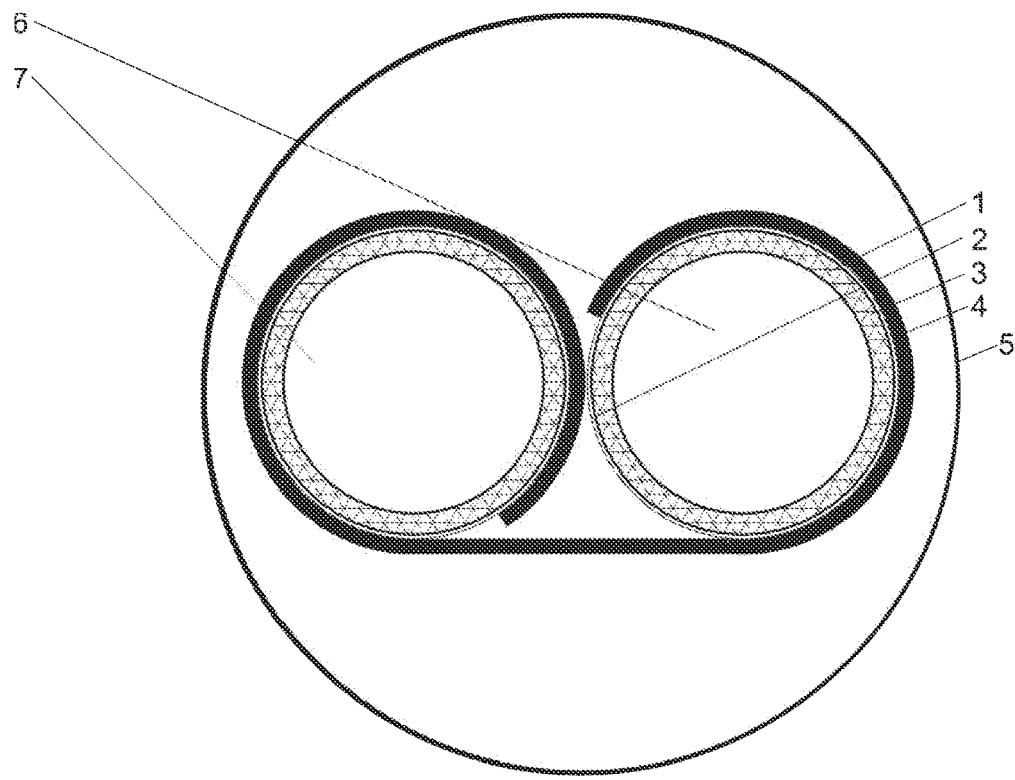
Figure 6:
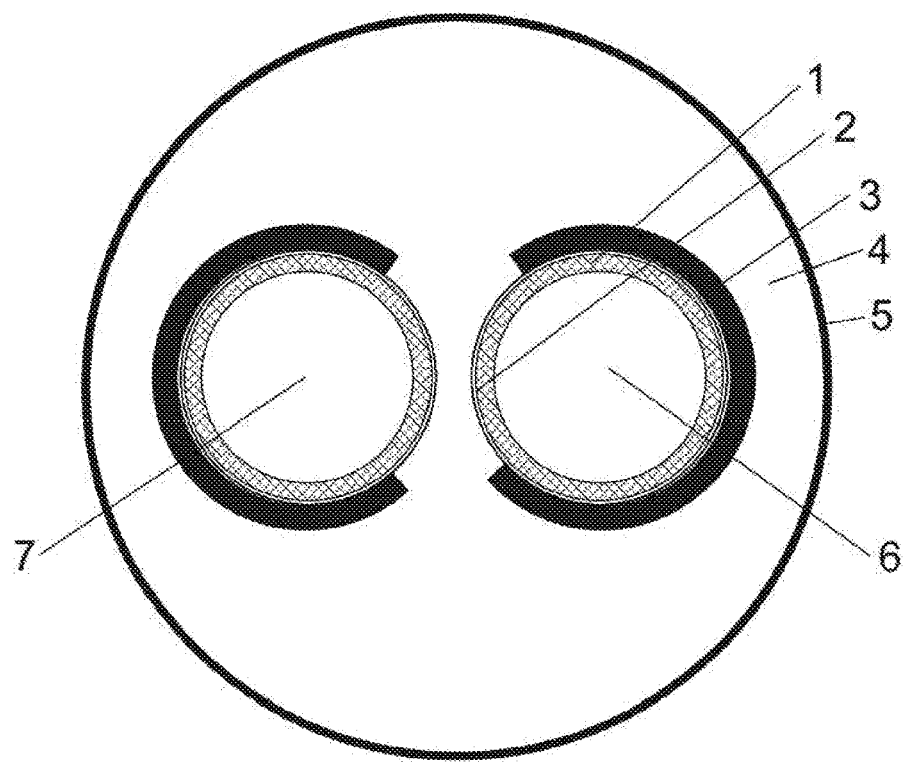

FIG. 2 shows a vacuum insulated pipe comprising one inner PEX-pipe with an alternative arrangement of the VIP FIG. 3 shows a twin-pipe comprising two vacuum-insulated inner PEX-pipes FIG. 4 shows a twin-pipe comprising two inner PEX-pipes, wherein one inner pipe is vacuum insulated FIG. 5 shows a twin-pipe comprising two inner PEX-pipes, wherein one VIP is wrapped around both inner pipes FIG. 6 shows a twin-pipe comprising two inner PEX-pipes, wherein one VIP is wrapped around the first inner pipe in a a U-shape and another one VIP is wrapped around the first inner pipe in a a U-shape, with the open parts of the U-shape being in each case directed to the other inner pipe

DETAILED DESCRIPTION

FIG. 1 shows an insulated pipe comprising an inner PEX-pipe (1), an optional diffusion barrier (2), a VIP (3), a PEX-foam (4), and a jacket pipe (5) which are arranged in a concentric manner.

FIG. 2 shows an an alternative embodiment of an insulated pipe comprising an inner PEX-pipe (1), an optional diffusion barrier (2), a VIP (3), a PEX-foam (4), and a jacket pipe (5) which are arranged in a concentric manner. In this alternative embodiment, the VIP is wrapped more than once around the inner PEX-pipe. Such an arrangement is preferred for insulated pipes with an outer diameter below 100 mm.

FIG. 3 shows a twin-pipe comprising two vacuum-insulated inner PEX-pipes comprising an inner PEX-pipe (1), an optional diffusion barrier (2), and a VIP (3), respectively. These two inner pipes are surrounded by a PEX-foam (4) which is again surrounded by a jacket pipe (5). The twin-pipe shows a non-concentric arrangement of the two inner pipes.

FIG. 4 shows a first alternative embodiment of a twin-pipe comprising two inner PEX-pipes, wherein the incoming pipe (highest temperatures) (6) comprises an inner PEX-pipe (1), an optional diffusion barrier (2), and a VIP (3), and wherein the return pipe (lower temperature) (7) comprises an inner PEX-pipe (1), and an optional diffusion barrier (2). These two inner pipes are surrounded by a PEX-foam (4) which is again surrounded by a jacket pipe (5). The twin-pipe shows a non-concentric arrangement of the two inner pipes.

FIG. 5 shows a second alternative embodiment of a twin-pipe comprising two inner PEX-pipes, wherein the incoming pipe (highest temperatures) (6) and the return pipe (lower temperature) (7) comprises an inner PEX-pipe (1), and an optional diffusion barrier (2), respectively. A VIP (3) is wrapped around both inner pipes such that the incoming pipe (highest temperatures) (6) is (almost) completely covered by the VIP (3) while the return pipe (lower temperature) (7) is partly covered by the VIP (3). These two inner pipes are surrounded by a PEX-foam (4) which is again surrounded by a jacket pipe (5). The twin-pipe shows a non-concentric arrangement of the two inner pipes.

Pipes in accordance with the embodiment of FIGS. 1 and 2 were examined with respect to their heat conductance and flexibility.

Heat Conductance Measurements

A 2600 mm piece of a pipe in accordance with the embodiment of FIG. 1 comprising a PEX-pipe with a diameter of 32 mm, a VIP (Va-Q-plus® of the company va-Q-Tec), PEX-foam layer, and outer plastic jacket was used as a testing sample. The same pipe without VIP was used as reference.

The testing method is based on standards SFS-EN 253: 2009 +A1:2013 and EN ISO 8497. The temperature was set to 70 (+5)° C.

The plastic cover of the sample was drilled to get temperature sensors installed around the sample to the outer surface of insulation. Insulation outer surface temperatures were measured on 14 points around the sample. An average temperature was calculated using 10 latest points. The average temperature is presented in the result table.

Both ends were insulated by >10 cm polyurethane end caps to prevent axial heat flux. As end losses were insignificant they were ignored. The heating resistor was fastened into the middle of the flow tube between end caps. Temperature of the flow tube was kept in the range of 70 (+5)° C. The pipe was stabilized at the test temperature for >10 hours.

Temperature sensors were placed inside the flow tube and covered with ceramic shields. The method differed from the standard method. Therefore, thermal resistance of PEX-pipe is noted calculatory by using 32 mm PEX-pipe values d=0.0044 m for PEX wall thickness and $\lambda$=0.35 W/mK.

TABLE 1

Results of the measurements for thermal conductance

|  | Unit | VIP32/140 | Reference (D140) |
|---|---|---|---|
| Insulation circumference | m | 0.33395 | 0.3708 |
| Flow tube diameter | m | 0.0323 | 0.0323 |
| Flow tube temperature | ° C. | 68.80 | 67.46 |
| Insulation temperature | ° C. | 10.37 | 13.80 |
| Power | W | 8.84 | 17.67 |
| Thermal conductivity, $\lambda$ | W/mK | 0.011 | 0.034 |
| Linear thermal conductance, ^ | W/mK | 0.058 | 0.165 |
| Difference to reference (^) | % | 65 | 0 |

Moreover, measurement on a 75 mm pipe in accordance with the embodiment of FIG. 2 were also conducted. This measurement is compared with a calculated value of the pipe without VIP.

| Outer Plastic pipe diameter [mm] | Pipe wall thickness [mm] | VIP thickness [mm] | Foam insulation [mm] | Jacket pipe diameter [mm] | U value [W/m²K] |
|---|---|---|---|---|---|
| 75 | 6.8 | 12 | 20.5 | 140 | 0.155 |
| 75 | 6.8 | 0 | 32.5 | 140 | 0.386 |

This measurement shows that by utilizing VIP it is possible to reduce the outer jacket wall thickness, while maintaining a very high U-value.

Flexibility Measurements

In short, one end of the pipe is fixed and the other end is pulled to create bending. The pipe bends with 0.5 m bend radius against support. The pipe is bent until movement is fully restrained by the support, which is 90° in theory.

Specifically, the following procedure was used:
Assemble the apparatus so that the distance between pulley and clamp fixture is 1 m
Clamp a pipe so that the distance between clamps is 1 m. Therefore, the sample length needs to be more than 1 m. (Wire/pipe angle 45 degrees)
Adjust the support so that it touches the pipe
Connect the clamp and the crane scale with steel wire and lift the crane until the wire is tight
Tare the electronic crane scale
Start recording with camera so that the crane scale can be seen in the video
Start lifting the overhead crane with slowest speed
Lifting and recording can be stopped after the support fully restrains bending and crane scale value increases significantly faster.

Below the results of the flexibility measurements are indicated.

Thermo single indicates that it is only one pipe inside, not two.

75 or 32 is the PEX pipe diameter, and the other number is the outer jacket diameter VIP long=VIP panels 1300 mm long VIP Short=VIP panels 313 mm long If VIP is not mentioned=only PEX foam insulation, no VIP

TABLE 2

Bending Force [N]/90°

|  | Bending Force in [N] at 90° |
|---|---|
| Thermo single 75/D200 | 688 |
| Thermo single 75/D175 (VIP long) | 677 |
| Thermo single 75/D140 (VIP long) | 703 |

TABLE 3

Bending Force [N]/90°

|  | Bending Force in [N] at 90° |
|---|---|
| Thermo single 32/D140 | 76 |
| Thermo single 32/D140 (VIP long) | 97 |
| Thermo single 32/D140 (VIP short) | 94 |
| Thermo single 32/D90 (VIP short) | 69 |
| Thermo single 32/D90 (VIP long) | 76 |

Accelerated Aging

Four experiments were conducted to evaluate the accelerated ageing of the VIP panels. All testing was made in a closed room. In order to minimize the temperature variations the access to the room was limited. Inside the room two coolers (Kylma) were mounted in order to keep the temperature constant.

Test No 1

A 32×2, 9 mm Uponor Radi pipe was insulated with VIP panels, short (300×313×6 mm) panels (32 mm pipe) and long version (1300×313×6 mm panels). There was no aluminum barrier between the VIP and the PEX. The pipes were set up in a test rig. An internally built water heater was used. The water temperature was set to 100° C. with continuous water circulation. The pipe was bent to r=350 mm. A $^{32}/_{140}$ mm standard Ecoflex pipe is specified for bending down to r=300 mm. Both the short and the long VIP panels were bent. The temperature was logged by an Expert L temperature logger.

Test No 2

75×6.8 mm Uponor Radi pipe with long VIP panel 1300×313×6 mm panels. The total length was 3.9 m. The PEX pipe was wrapped in aluminum foil in a helix shape manner. The aluminum foil was 0.1 mm thick 600 mm wide. There was about 50-100 mm overlapping on each turn. Three VIP panels were used. Two of the panels were straight and the third panel was bent, corresponding to a radius of 400 mm which is more aggressively bent compared to a standard $^{75}/_{200}$ Ecoflex pipe that is only allowed bending down to 700 mm.

The water temperature was 110° C. To reach this high temperature two heaters had to be used in parallel. One heater was set to 110° C. and the other to 105° C. The second heater had to be set to 105° C., as the over temperature protection will shut the heater down at 110° C. This heater was used also for Test No 3 and Test no 4.

Test No 3

A 32×2.9 mm Uponor Radi pipe with long VIP panel 1300×313×6 mm panels) and PEX foam were inside the 90 mm outer jacket. The total length was 1.3 m, i.e. only one VIP panel. The pipe was first temperature logged during 1 week as straight pipe, then the pipe was bended to a radius of 300 mm, i.e the same bending radius that is allowed for a $^{32}/_{140}$ mm Ecoflex.

Test No 4

A 75×6.8 mm Uponor Radi pipe with VIP panels inside the 140 mm outer jacket. The pipe was produced in Nastola. The total length was 1.2 m. The testing procedure was in accordance to Test no 3. The pipe was bent to a radius of 200 mm, which is much more aggressively bent compared to a standard $^{75}/_{200}$ Ecoflex pipe that is only allowed bending down to 700 mm. The pipe was more or less necking when bended.

If there is an ageing effect, the insulation properties of the VIP panel will decay, resulting in that the temperature outside the VIP panel would gradually increase as a function of time. One pipe was aged 1 year and one month, and the remaining three pipes were aged for almost 11 month. The temperature was considerable higher than the service temperature, which will accelerate the ageing. It shall be noted that also the PEX material is aged at this elevated temperatures. Three of the four pipes were aged at 110° C. At this temperature the required life time of a PEX pipe is 1 year. The VIP has thus been exposed to a really extensive ageing in these experiments. There were no significant indications of ageing in any of the results. Ageing seems thus not to be critical for this application, despite that the VIP panels are bent in 2 directions. These experiments do not indicate that an aluminum foil is necessary in order to prevent ageing.

The reference numbers in the Figures have the following meaning:

1 inner PEX-pipe
2 Optional diffusion barrier
3 Vacuum insulation panel (VIP)
4 PEX-Foam
5 Outer plastic jacket
6 "Incoming" pipe (highest temperature)
7 Return pipe (lower temperature)

I claim:

1. An insulated pipe for local heat distribution, the insulated pipe comprising:
   a single inner pipe for local heat distribution, the single inner pipe comprising plastic and having a diameter from 20 to 120 mm;
   a flexible vacuum insulation panel surrounding the single inner pipe; and
   an outer jacket,
   wherein both (i) the single inner pipe and (ii) the outer jacket comprise a cross-linked or non-cross-linked polyolefine, selected from the group consisting of polyethylene of raised temperature resistance (PE-RT), polypropylene (PP), polypropylene random copolymer (PPR) with about 5% PE in a molecular chain of PP random uniform polymer (random copolymer), polybutylene (PB), cross-linked polyethylene (PEX), and mixtures thereof, and wherein:
   a bending force for 90° bending a portion of the insulated pipe, where the single inner pipe has a diameter of 20 to 60 mm and the insulated pipe is clamped at a distance of 1 m around a support, differs less than 40% as compared to a bending force for 90° bending of a same pipe without the flexible vacuum insulation panel; or
   a bending force for 90° bending a portion of the insulated pipe, where the single inner pipe has a diameter of 60 to 120 mm and the insulated pipe is clamped at a distance of 1 m around a support, differs less than 20% as compared to a bending force for 90° bending of a same pipe without the flexible vacuum insulation panel.

2. The insulated pipe according to claim 1, further comprising of:
   a diffusion barrier in contact with the single inner pipe and the flexible vacuum insulation panel and located between the single inner pipe and the flexible vacuum insulation panel.

3. The insulated pipe according to claim 2, wherein the diffusion barrier is made of a material selected from the group consisting of ethylene vinyl alcohol (EVOH), aluminum foil, and a combination thereof.

4. The insulated pipe according to claim 1, further comprising a flexible layer beneath the outer jacket, selected from the group consisting of cross-linked polyethylene foam, non-cross-linked polyethylene foam and polyurethane.

5. The insulated pipe according to claim 1, wherein a core of the flexible vacuum insulation panel comprises a powder of inorganic oxides.

6. The insulated pipe according to claim 5, wherein the powder of inorganic oxides is a fumed silica powder.

7. The insulated pipe according to claim 1, wherein the single inner pipe is arranged in a concentric manner with respect to an optional diffusion barrier, the flexible vacuum insulation panel, and the outer jacket.

8. The insulated pipe according to claim 7, wherein the flexible vacuum insulation panel is wrapped more than once around the single inner pipe.

9. The insulated pipe according to claim 1, wherein the insulated pipe has a thermal conductivity of less than 0.015 W/(m*K).

10. The insulated pipe according to claim 1, wherein the insulated pipe has a linear thermal conductance A of less than 0.08 W/(m*K).

11. The insulated pipe according to claim 1, wherein the insulated pipe has a linear thermal conductance A which is 65% reduced compared to a same pipe without the flexible vacuum insulation panel.

12. The insulated pipe according to claim 1, wherein the flexible vacuum insulation panel comprises a filter material.

13. The insulated pipe according to claim 1, wherein the single inner pipe comprises cross-linked polyethylene (PEX).

14. The insulated pipe according to claim 1, wherein a bending force for 90° bending a portion of the insulated pipe where the single inner pipe has a diameter 25 to 40 mm, clamped at a distance of 1 m around a support differs less than 30% as compared to a same pipe without the flexible vacuum insulation panel.

15. The insulated pipe according to claim 1, wherein a bending force for 90° bending a portion of the insulated pipe where the single inner pipe has a diameter 65 to 90 mm, clamped at a distance of 1 m around a support differs less than 10% as compared to a same pipe without the flexible vacuum insulation panel.

16. The insulated pipe according to claim 1, wherein the flexible vacuum insulation panel has a core and an envelope surrounding the core.

17. The insulated pipe according to claim 16, wherein the core of the flexible vacuum insulation panel comprises an unmolded, loose and powdery material.

18. The insulated pipe according to claim 16, wherein the envelope of the flexible vacuum insulation panel has grooves.

19. The insulated pipe according to claim 1, wherein the insulated pipe further comprises a layer of ethylene vinyl alcohol (EVOH) as a diffusion barrier that is in contact with the single inner pipe and the flexible vacuum insulation panel and that is located between the single inner pipe and the flexible vacuum insulation panel.

20. The insulated pipe of claim 1, wherein the flexible vacuum insulation panel has a thickness from 5 to 40 mm.

21. An insulated pipe for local heat distribution, the insulated pipe comprising:
   only one inner pipe for local heat distribution, the one inner pipe comprising plastic;
   a flexible vacuum insulation panel surrounding the one inner pipe; and
   an outer jacket,
   wherein both (i) the one inner pipe and (ii) the outer jacket comprise a cross-linked or non-cross-linked polyolefine, selected from the group consisting of PE-RT (Polyethylene of Raised Temperature resistance), polypropylene (PP), polypropylene random copolymer (PPR) (about 5% PE in a molecular chain of PP random uniform polymer (random copolymer), polybutylene (PB), cross-linked polyethylene (PEX), and mixtures thereof,
   wherein:
      a bending force for 90° bending a portion of the insulated pipe, where the one inner pipe has a diameter of 20 to 60 mm and the insulated pipe is clamped at a distance of 1 m around a support, differs less than 40% as compared to a bending force for 90° bending of a same pipe without the flexible vacuum insulation panel; or
      a bending force for 90° bending a portion of the insulated pipe, where the one inner pipe has a diameter of 60 to 120 mm and the insulated pipe is clamped at a distance of 1 m around a support, differs less than 20% as compared to a bending force for 90° bending of a same pipe without the flexible vacuum insulation panel,
   wherein the flexible vacuum insulation panel has a core and an envelope surrounding the core, and
   wherein the envelope of the flexible vacuum insulation panel has grooves (i) extending in a direction of a greatest length of the flexible vacuum insulation panel and (ii) spaced apart between 1 and 3 centimeters.

* * * * *